United States Patent [19]
Johnson

[11] Patent Number: 5,878,560
[45] Date of Patent: Mar. 9, 1999

[54] NARROW ROW CORN HEAD WITH TILTED GATHERERS

[75] Inventor: Orlin W. Johnson, Geneseo, Ill.

[73] Assignee: Case Corporation, Racine, Wis.

[21] Appl. No.: 780,362

[22] Filed: Jan. 9, 1997

[51] Int. Cl.[6] ................................................. A01D 45/02
[52] U.S. Cl. .......................... 56/66; 56/82; 56/88; 56/98; 56/111
[58] Field of Search .................... 56/119, 59, 66, 56/75, 78, 82, 88, 93, 98, 106, 108, 111

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Proctor . |
| 3,496,708 | 2/1970 | Bornzin . |
| 3,528,233 | 9/1970 | Martner et al. . |
| 3,528,234 | 9/1970 | Kowalik et al. . |
| 3,585,789 | 6/1971 | Blanshine et al. ..................... 56/106 X |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 3,995,412 | 12/1976 | Gaeddert et al. ..................... 56/15.3 X |
| 4,009,557 | 3/1977 | Reicks . |
| 4,106,270 | 8/1978 | Weigand et al. . |
| 4,227,368 | 10/1980 | Mossman et al. . |
| 4,259,831 | 4/1981 | Jerke et al. ........................... 56/106 X |
| 4,269,017 | 5/1981 | deBuhr et al. . |
| 4,327,542 | 5/1982 | Van Ginhoven . |
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron . |
| 5,528,887 | 6/1996 | Nagy et al. . |

OTHER PUBLICATIONS

*Farm Show*, vol. 20, No. 5, 1996—"Build–It–Yourself" Narrow Row Header Kit.
*Farm Industry News*, vol. 29, No. 11, 1996—"Does Narrow Row Corn Add Up?".
*Ontario Farmer*, vol. 29, No. 40, 1996—"Thinking 15–Inch".
1000 Series Corn Head, Operators Manual, 1995 Case Corporation.
1000 Series Corn Head, Parts Catalog, 1993 Case Corporation.
Allis–Chalmers Tractor Division–Milwaukee, U.S.A., "1918–1960, An Informal History", Copyright 1989 by Alan C. King.
Operators Manual, Setting Up Instructions, "McCormick 34HM–21 Corn Snapper (Two Row, Mounted Type)", International Harvester Company (Date unknown).
Instruction Manual and Parts List, "Snapping Unit Frame Field Improvement Parts for McCormick–Deering, No. 14P, No. 24, Corn Pickers", International Harvester Company (Date unknown).
CP–8 McCormick Parts Catalog, "34HM–20 Corn Picker, 34HM–21 Corn Snapper, 34HM–22 Sweet Corn Picker (Two–Row, Mounted–Type)", International Harvester Company (Date unknown).

*Primary Examiner*—Terry Lee Melius
*Attorney, Agent, or Firm*—Foley & Lardner

[57] ABSTRACT

A row crop header for a harvesting machine includes a frame and a row unit supported by the frame in a row unit plane. The row unit includes a gatherer operating in a gatherer plane oblique to the row unit plane.

18 Claims, 5 Drawing Sheets

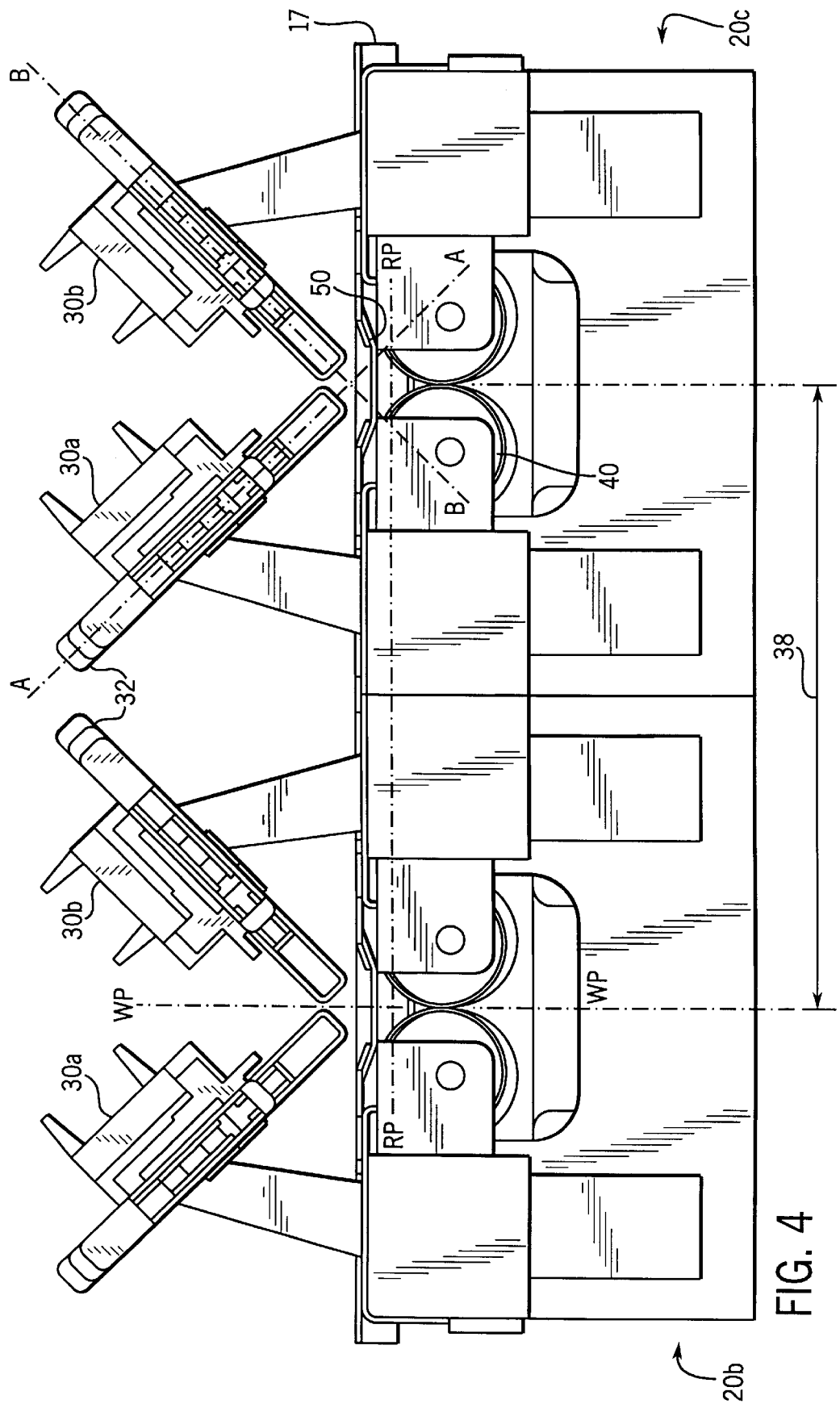

5,878,560

NARROW ROW CORN HEAD WITH TILTED GATHERERS

FIELD OF THE INVENTION

The present invention relates to a row crop harvesting machine. In particular, the present invention relates to a header for a row crop harvesting machine that is designed to harvest crops, such as corn, planted in rows spaced closer together than in the past.

BACKGROUND OF THE INVENTION

Several variations of header units are commonly used in combines or harvesting machines for harvesting row crops such as corn and cotton. One such header unit is a corn head with fixed spacing between the row units. Several other corn heads allowing variable spacing between the row units have also been developed. However, both fixed and variable spacing corn heads are designed to only efficiently harvest corn planted in rows having a row width of greater than 20 inches.

Recent research on the spacing of the corn rows has indicated special benefits for narrower row spacings that are 12–16 inches apart. In addition to the obvious increase in yield and crop population, these benefits include improved erosion control and better weed control. The narrower rows also require less chemicals and pesticides per unit of yield, thereby benefitting the environment.

Unfortunately, existing header units are not designed to harvest rows having a spacing of 16 inches or less. Moreover, modifying existing header units to effectively harvest rows having spacing of 16 inches or less is difficult, if not impossible. The ability to modify existing header units for row widths of less than 20 inches is inherently limited by the size of row unit components. For example, row units typically include gatherers adapted for contacting and moving corn ears or other harvested crop into the header unit. The conventionally required spacing of the gatherers limits constructing row units closer together for harvesting rows of crops having a spacing of less than 20 inches. Consequently, existing header units are very wasteful and inefficient in harvesting narrow rows leading to a sub-optimal harvesting efficiency.

The problems identified above are not intended to be exhaustive but are among the many that reduce the effectiveness of current solutions to the problem of harvesting crops planted in narrow rows. Other problems may also exist; however, those presented above should be sufficient to demonstrate that currently known solutions are amenable to worthwhile improvement.

SUMMARY OF THE INVENTION

The present invention is an improved row crop header for a harvesting machine. The row crop header includes a frame and a first row unit supported by the frame in a row unit plane. The first row unit includes a first gatherer operating in a first gatherer plane oblique to the first row unit plane.

In a more preferred embodiment, the row crop header additionally includes a second gatherer operating in a second gatherer plane oblique to the first gatherer plane. The second gatherer preferably operates in a second gatherer plane that is also oblique to the row unit plane.

In another preferred embodiment, the header includes a second row unit supported by the frame adjacent the first row unit in the row unit plane. The second row unit has a second gatherer adjacent the first gatherer. The second gatherer operates in a second gatherer plane oblique to the first gatherer plane.

In the most preferred embodiment, the row crop header comprises a corn header. Each row unit preferably includes a plurality of stalk rolls supported by each row unit and a plurality of stripper plates cooperatively positioned within the row unit proximate the plurality of stalk rolls to remove corn ears from corn stalks. The gatherers convey the removed corn ears to a rear of the crop header.

BRIEF DESCRIPTION OF THE DRAWINGS

FIG. 4 is a front view of two adjacent row units of the row crop header.

DETAILED DESCRIPTION OF THE PREFERRED EMBODIMENTS

Figure 1:
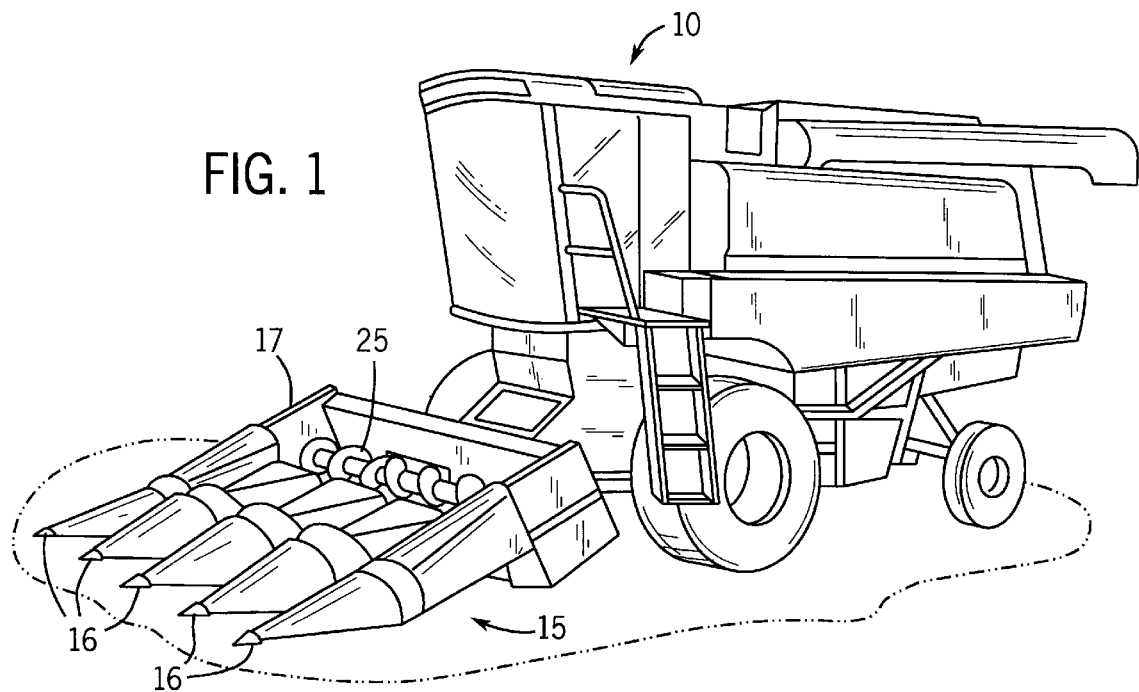
FIG. 1 is a perspective view of a harvesting machine with a row crop header of the invention.

FIG. 1 is a perspective view illustrating row crop header 15, connected to a combine or harvesting machine 10. The improved row crop header 15 has a unique configuration that permits the efficient harvesting of the crops planted in rows spaced closer together than in the past.

Figure 2:
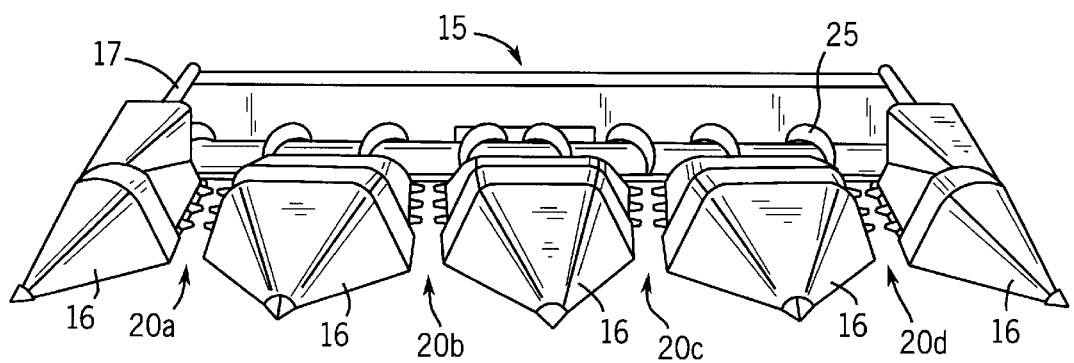
FIG. 2 is a front perspective view of the row crop header.

FIG. 2 is a front perspective view illustrating row crop header 15 in greater detail. As shown by FIG. 2, row crop header 15 generally includes frame 17, row units 20a–20d, housings or shields 16, and cross conveyor 25. Frame 15 is a generally rigid elongate support structure configured for being mounted to harvesting machine 10 (shown in FIG. 1) and for also supporting row units 20a–20d, shields 16 and cross conveyor 25. As can be appreciated, frame 15 may have a variety of sizes and configurations dependent upon the type of harvesting machine 10 to which header 15 is mounted or attached, the type of crop harvested by header 15, and the number of row units 20a–20d supported by frame 15.

Figure 3:
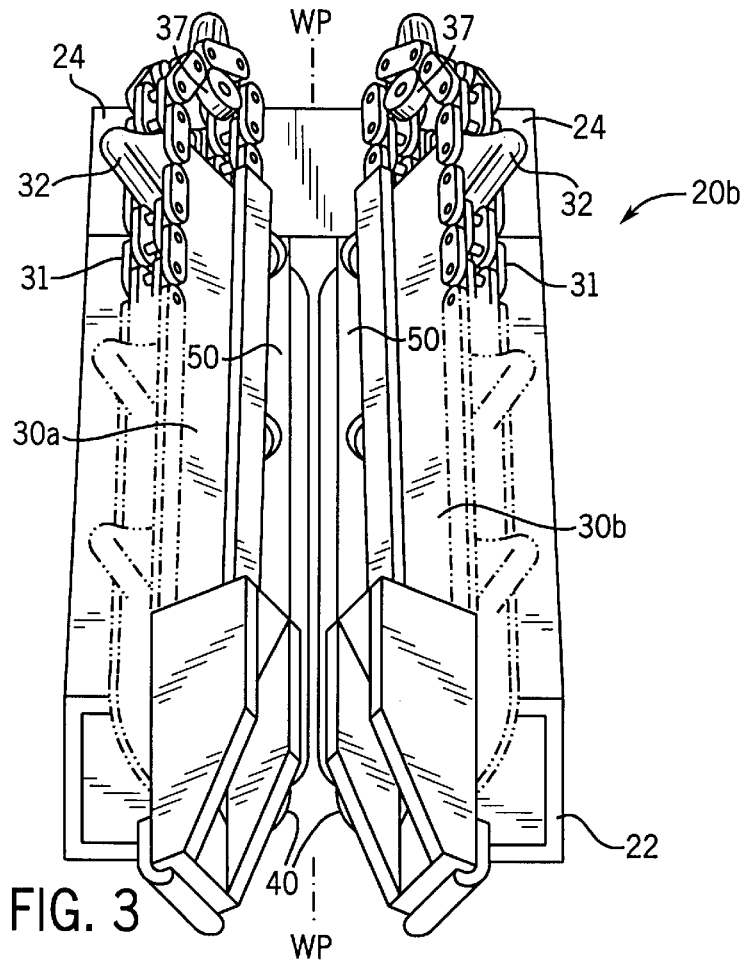
FIG. 3 is a perspective view of a row unit of the row crop header.
Figure 3A:
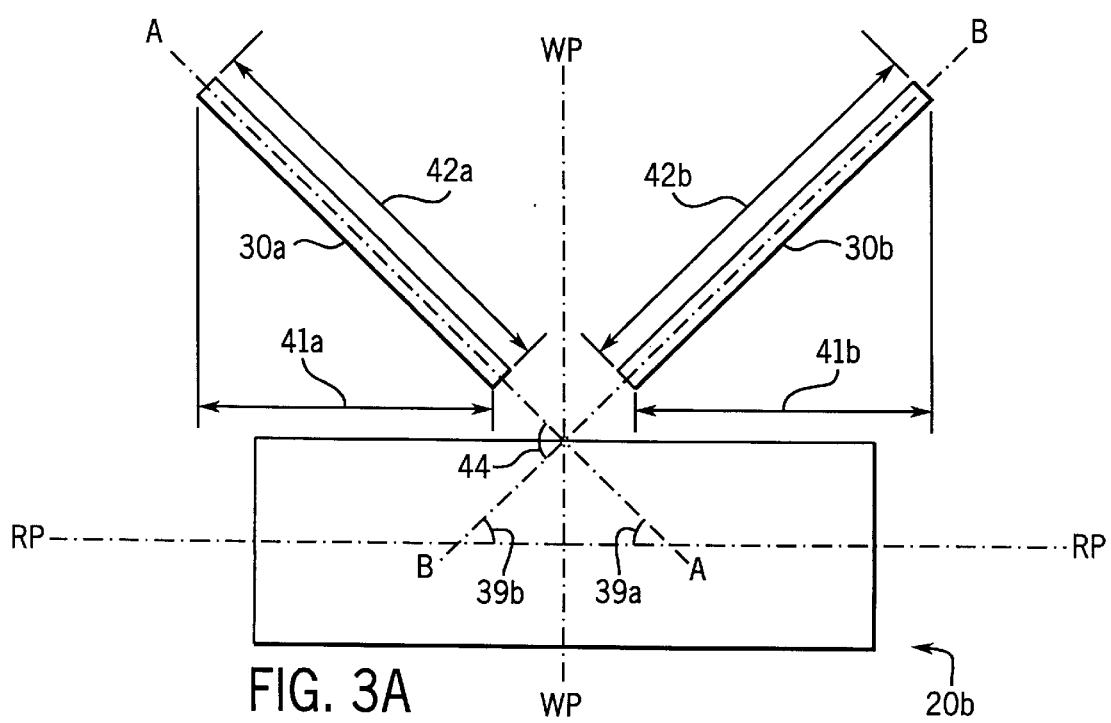
FIG. 3A is schematic view of the row unit.

Row units 20a–20d are supported by frame 15 along a front of frame 15 in a row unit plane (further illustrated in FIGS. 3A, 4A and 4B). In the preferred embodiment illustrated, header 15 is specifically designed for harvesting corn. As a result, each row unit 20 is specifically configured for removing ears of corn from their respective corn stalks and conveying the ears of corn rearwardly towards cross conveyor 25. In the preferred embodiment illustrated, header 15 includes four individual row units 20a–20d between adjacent shields 16.

Shields 16 are supported by frame 15 so as to enclose and house portions of row units 20a–20d. Shields 16 further project forward of row units 20a–20d to guide and funnel crop rows to row units 20a–20d.

Cross conveyor 25 is supported by frame 15 rearward of row units 20a–20d. Cross conveyor 15 conveys removed ears of corn from row units 20a–20d to a central intake for harvesting machine 10 (shown in FIG. 1). Cross conveyor 25 preferably comprises an auger rotated by a power system (not shown). As can be appreciated, cross conveyor 25 may comprise a variety of other conveying mechanisms.

FIG. 3 is a front perspective view of row unit 20b with shields 16 removed for purposes of illustration. As shown by FIG. 3, each row unit 20a–20d includes support 21, stripper plates 50, stalk rolls 40, and gatherers 30a, 30b. Support 21 includes a backing plate 24 and mounts each row unit 20 to frame 17. Support 21 further supports each row unit 20 forward of frame 17 for engaging crop rows.

Stripper plates 50 are generally flat plates rigidly mounted to support 21 and spaced apart for receiving corn stalks. In a preferred embodiment, stripper plates 50 are spatially adjustable to increase or decrease spacing between stripper plates 50. Stripper plates 50 engage opposite sides of a corn stalk to remove ears of corn from stalks as stalk rolls 40 pull the corn stalks through stripper plates 50.

Stalk rolls 40 are generally elongate stalk engaging members configured for grasping and moving engaged corn stalks in a downward direction. Stalk rolls 40 are rotatably mounted to frame 17 below stripper plates 50. Stalk rolls 40 are rotated to pull corn stalks through and between stripper plates 50. Stalk rolls 40 cooperate with stripper plates 50 to remove corn ears from the stalks.

Gatherers 30a, 30b each include a gathering chain 31 driven by at least one sprocket 37. Gathering chain 31 includes a plurality of protruding members extending outward from the gathering chain 31. In the preferred embodiment, the protruding members comprise protruding fingers 32 having at least one surface adapted for contacting and moving ears of corn or other harvested crops. Gathering chain 31 traverses a substantially oblong or oval path and extends between frame end 22 and head end 23 of row unit 20. The oblong or oval path through which gathering chain 31 operates is generally contained in a plane that is oblique to the general plane containing backing plate 21 and each of row units 22. Because gathering chain 31 of gatherers 30a, 30b operate in a plane oblique to the plane generally containing row units 20 and oblique to the ground surface below header 15, gatherers 30a, 30b of each row unit 20 may be more closely spaced and gatherers 30a, 30b of consecutive adjacent row units 22 may be more closely spaced together.

Although row unit 20 is illustrated as including a pair of gatherers 30a, 30b, row unit 20 may alternatively include a single gatherer or greater than two gatherers for moving the harvested crop to cross conveyor 25 (shown in FIG. 2). Moreover, gatherers 30a, 30b may have a variety of alternative configurations. For example, gatherers 30a, 30b may alternatively include a belt, rope or similar device with protruding members adapted to move crops in lieu of chain 31 and fingers 32.

FIGS. 3A and 4 illustrate the narrower width of row units 20a–20d as well as the closer spacing between adjacent row units 20a–20d. FIG. 3A is a schematic view of an individual row unit 20b illustrating the narrow width of row unit 20b. FIG. 4 is a front view illustrating two adjacent row units 20b, 20c having working planes WP separated by a distance 38. As shown by FIG. 4, frame 17 supports row units 20b–20c in and along a row unit plane RP—RP which transversely extends along header 15 through each row unit 20b–20c supported by frame 17. The row unit plane RP—RP along which row units 20b–20c are supported extends parallel to the plane extending generally along backing plate 24 (shown in FIG. 3) and the plane passing through stalk rolls 40. The row unit plane RP—RP also extends generally parallel to the ground surface over which header 15 is supported. The row unit plane RP—RP along which row units 20a–20d are supported by frame 17 extends substantially perpendicular to each work plane WP—WP which, on a generally flat surface, passes through the respective crop row being harvested by each row unit 20a–20d.

As schematically shown by FIG. 3A, gatherers 30a, 30b each operate in a gatherer plane. In the preferred embodiment, gatherer 30a operates in gatherer plane A—A and gatherer 30b operates in gatherer plane B—B. Gatherer plane A—A is oblique to gatherer plane B—B. Both gatherer plane A—A and gatherer plane B—B are oblique to both the row unit plane RP—RP and the work plane WP—WP. It is to be understood that any two planes are "oblique" to each other as along as they are not parallel to each other. For example, gatherer plane A—A is oblique to gatherer plane B—B so long as the oblique angle 44 is substantially between 1 degree and 179 degrees.

The oblique positioning of the gatherer planes A—A and B—B reduces the width of the row unit 20b measured along the row unit plane RP—RP. That is, the projected width 41a of the primary gatherer 30a along the row unit plane RP—RP is less than the actual width 42a measured along the primary gatherer plane A—A. Likewise, the projected width 41b of the secondary gatherer 30b measured along the row unit plane RP—RP is less than the actual width 42b of the secondary gatherer 30b measured along the secondary gatherer plane B—B. Increasing the primary angle 39a between the primary gatherer plane A—A and the row unit plane RP—RP further reduces the projected width 41a of the primary gatherer 30a measured along the row unit plane RP—RP. Likewise, increasing the secondary angle 39b between the secondary gatherer plane B—B and the row unit plane RP—RP reduces the projected width 41b of the secondary gatherer 30b measured along the row unit plane RP—RP. In the preferred embodiment, both the angles 39a and 39b are approximately between 30 degrees and 50 degrees. Also in the preferred embodiment, the primary gatherer plane A—A is substantially perpendicular to the secondary gatherer plane B—B so that the oblique angle 44 is approximately 90 degrees.

As shown in FIG. 4, the first row unit 20b has a primary gatherer 30a operating in the primary gatherer plane A—A. The adjacent second row unit 20c has a secondary gatherer 30b, adjacent to the primary gatherer 30a of the first row unit 20a, operating in the secondary gatherer plane B—B. It is to be understood that "adjacent" row units refer to two row units 20, such as row unit 20b and row unit 20c, that are placed next to each other along the frame although structural members or other elements could be interposed between the two adjacent row units 20. Thus, row unit 20a is adjacent to row unit 20b as long as no other row unit 20 is positioned between them even though other structural members or elements may be interposed between them.

As shown by FIG. 4, the secondary gatherer plane B—B is oblique to the first gatherer plane A—A. As a result, adjacent gatherers 30a and 30b are positioned closer together without the fingers 32 of the gatherers 30a, 30b interfering with each other during the operation of the row crop header 15. Because the primary gatherer 30a of the first row unit 20b operates in a different plane from the adjacent secondary gatherer 30b of the adjacent second row unit 20c, adjacent row units 20a, 20b are arranged closer together than in the existing corn heads.

Overall, the closer arrangement of the row units 20a–20d, together with the decreased width of the row units 20a–20d due to the oblique gatherer planes A—A and B—B, reduces the distance between the work planes WP—WP of two adjacent row units. The harvesting width 38 is the distance between the work planes WP—WP of two adjacent row units. In the preferred embodiment, the harvesting width 38 is less than 16 inches.

Figure 5A:
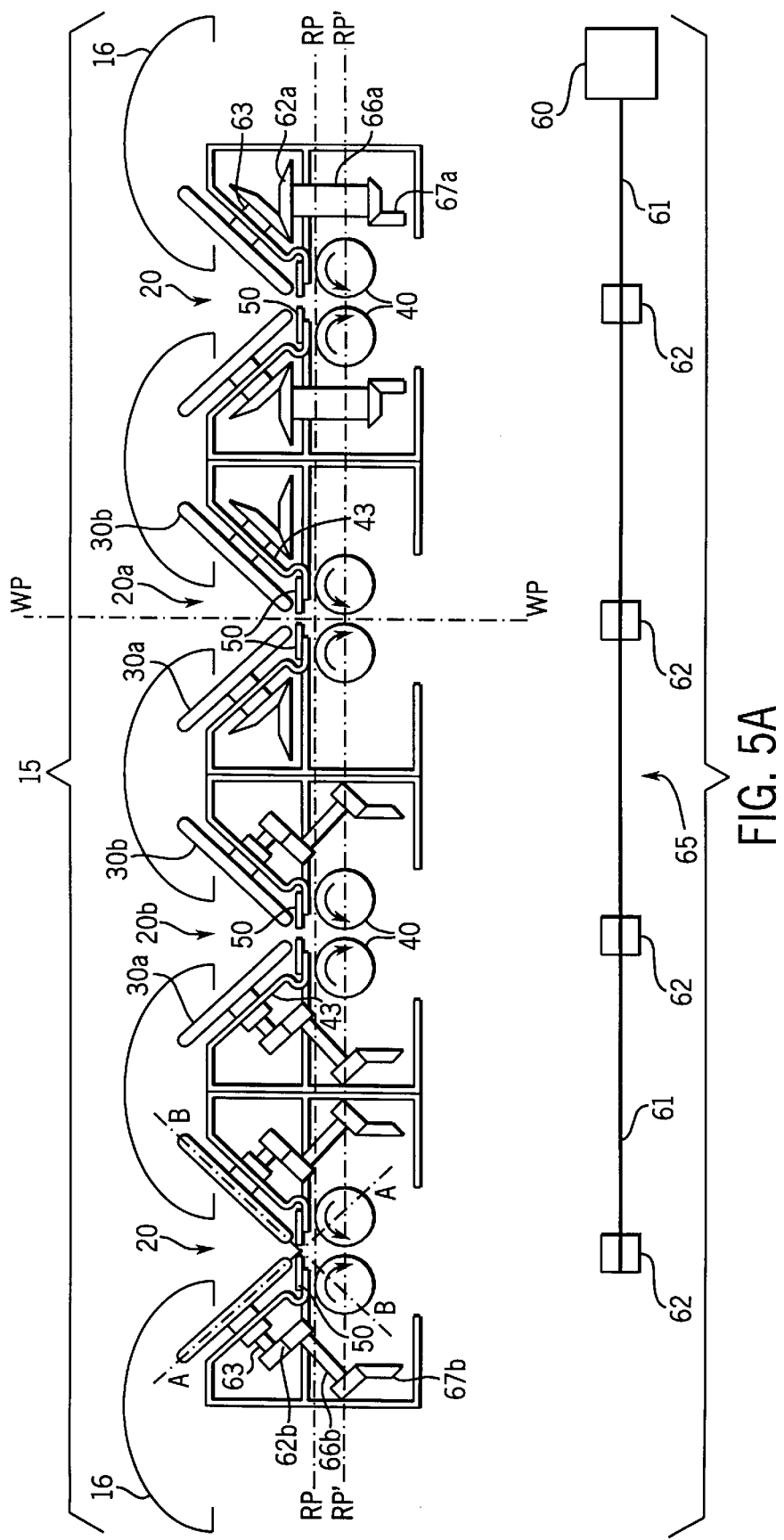
FIG. 5A is a schematic front view of the row crop header.

FIG. 5A is a front view of header 15 schematically illustrating row units 20*a*–20*d* and drive mechanism 65. As shown by FIG. 5A, drive mechanism 65 includes a power source 60 connected to a drive shaft 61 with a plurality of gear boxes 62 adapted so that the power outputs from the gear boxes 62 drive the gatherers 30 and the stalk rolls 40. In the preferred embodiment, the gear box 62 has bevel gears 67*a* that transmit power from the drive shaft 61 to an intermediate shaft 66*a*. The intermediate shaft 66*a* drives the gatherer shaft 63 with an extra set of bevel gears 62*a*. The gatherer shafts 63 drive the gatherers sprockets 37 also using bevel gears (not shown).

In an alternative embodiment, the gear box 62 has worm gears (not shown) that transmit power from the drive shaft 61 to the gatherer shafts 63. The gatherer shafts 63 are oblique to the drive shaft 61 and directly drive the gatherer sprockets 37. In another alternative embodiment, an oblique intermediate shaft 66*b* is driven by the drive shaft 61 by either using bevel gears 67*b* or worm gears in the gear box 62. An extra set of spur gears 62*b* is used to transmit power from the intermediate shaft 66*b* to the gatherer shaft 63.

Although shown schematically by FIG. 5A as being separate for the purposes of clarity, it is to be understood that drive mechanism 65 is suitably installed within the row crop header 15 and connected to the driven row unit components. The drive mechanism 65 and gearing systems used are described in several U.S. Patents and textbooks and any of them could be easily adapted for use with the row crop header 15. For example, spur, worm, and bevel gearing are described in the textbook by Hamilton H. Mabie and Charles L. Reinholtz, *Mechanisms and Dynamics of Machinery*, John Wiley and Sons, Inc, pgs. 128–235, the disclosure of which is incorporated by reference.

Figure 5B:
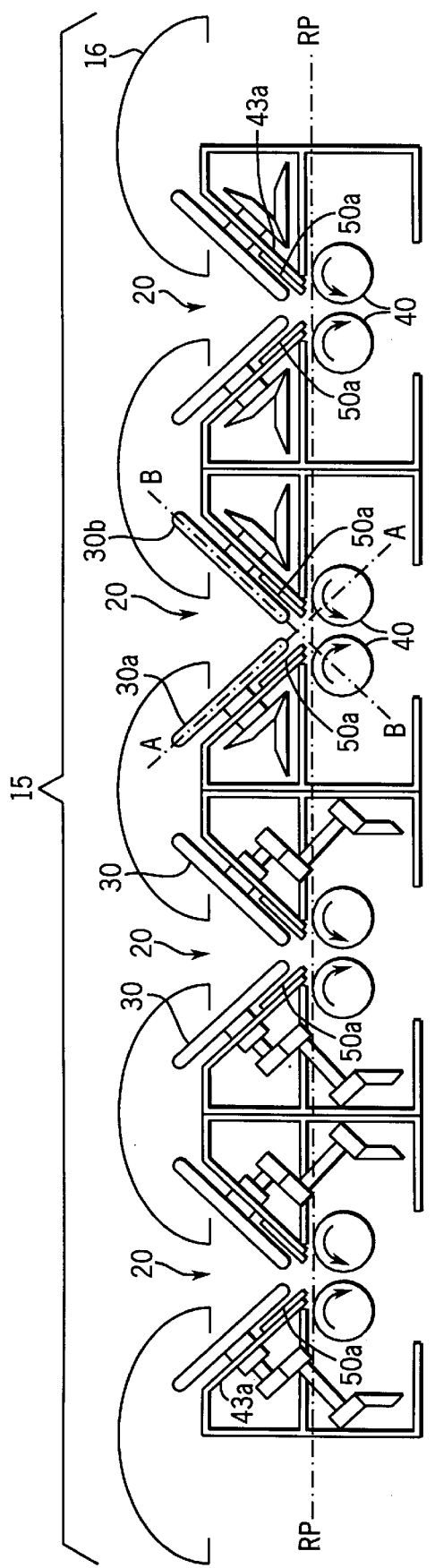
FIG. 5B is a schematic front view of an alternative embodiment of the row crop header.

As further shown by FIG. 5A, the additional space within the structure of the row unit 20 allows for row unit components, drive mechanisms and gearing systems that are stronger and more durable than in existing row units. For example, in the preferred embodiment shown in FIG. 5A, the stripper plates 50 are substantially parallel to the row unit plane RP—RP. In the alternative embodiment, shown in FIG. 5B, the stripper plates 50*a* are positioned substantially parallel to the gatherer planes A—A and B—B, respectively. The oblique positioning of the gatherer planes A—A and B—B allows for additional space within the structure of the row unit 20. The additional space permits stripper plates 50 to be supported by frame 17 at a variety of angles. Moreover, the additional space permits the design and use of a stronger stripper base 43 to impart additional strength to the stripper plates 50. The stronger stripper base 43 permits the use of straight stripper plates 50 that allow for gentler contact with the corn ears that are harvested by the row crop header 15.

Overall, the improved row crop header 15 permits a closer arrangement of the row units 20*a*–20*d* to harvest crop rows that are 15 inches apart or less. Existing corn heads with the row units in substantially the same plane are unable to efficiently harvest rows that are narrower than 20 inches. As a result, the instant row crop header permits the harvesting of narrower crop rows by allowing the row units to be arranged closer together on the row crop header frame.

Other embodiments of the row crop header will be apparent to those skilled in the art from consideration of the specification disclosed herein. It is intended that the specification be considered as exemplary only, with the true scope and spirit of the invention being indicated by the following claims.

What is claimed is:

1. A row crop header for a harvesting machine, the harvesting machine supported by and moveable over a ground, the row crop header comprising:
    a frame; and
    a first row unit having a frame end and a head end and supported by the frame in a row unit plane, the first row unit including a first gatherer having a first plurality of crop engaging protuberances extending and operating in at least one first gatherer plane oblique to the row unit plane and a second gatherer having a second plurality of crop engaging protuberances extending and operating in at least one second gatherer plane oblique to the row unit plane, wherein the first and second pluralities of crop engaging protuberances extend oblique to the row unit plane from the frame end to the head end, and
    wherein the first and second gatherer planes intersect at a first distance from the ground, and a plane perpendicular to the first gatherer plane intersects a plane perpendicular to the second gatherer plane at a second distance from the ground, the first distance being less than the second distance.

2. The row crop header of claim 1 wherein the first gatherer is at an oblique first angle with the row unit plane.

3. The row crop header of claim 2 wherein the first angle is between about 30 degrees and about 50 degrees.

4. The row crop header of claim 1, including a second row unit supported by the frame adjacent to the first row unit, the second row unit having a second gatherer adjacent the first gatherer of the first row unit, the second gatherer operating in a second gatherer plane oblique to the first gatherer plane.

5. The row crop header of claim 1 wherein the first row unit includes a plurality of stripper plates extending along the row unit plane.

6. The row crop header of claim 1 wherein the first row unit includes a plurality of stalk rolls extending along the row unit plane.

7. The row crop header of claim 1 wherein the second gatherer is at an oblique second angle with the row unit plane.

8. The row crop header according to claim 7 wherein the second angle is approximately between 30 degrees and 50 degrees.

9. The row crop header of claim 1 wherein the first gatherer plane is substantially perpendicular to the second gatherer plane.

10. The row crop header of claim 1 wherein both the first gatherer and the second gatherer include a plurality of fingers connected to a gathering chain.

11. The row crop header of claim 1 wherein the first row unit includes:
    a plurality of stalk rolls supported by the first row unit; and
    a plurality of stripper plates cooperatively positioned within the first row unit proximate the plurality of stalk rolls to remove corn ears from corn stalks, wherein both the first gatherer and the second gatherer move the removed corn ears.

12. The row crop header of claim 11 wherein the plurality of stripper plates includes two adjustably spaced plates.

13. The row crop header of claim 1 wherein the first gatherer and the second gatherer extend along opposite sides of a work plane and wherein the first gatherer plane and the second gatherer plane are oblique to the work plane.

14. The row crop header of claim 13 wherein the work plane is substantially perpendicular to the ground.

15. The row crop header of claim 13 wherein the work plane passes substantially through a crop row engaged by said at least one row unit.

16. The row crop header of claim 1 including a power source having a gear box, wherein the power source drives both the first gatherer and the second gatherer.

17. A row crop header for a harvesting machine, the harvesting machine supported by and moveable over a ground, the row crop header comprising:

a frame; and at least one row unit mounted on the frame in a row unit plane, said at least one row unit having a frame end and a head end and including:

a first gatherer having a first plurality of crop engaging protuberances spaced along the row unit from the frame end to the head end, the first plurality of protuberances extending and operating in a first gatherer plane;

a second gatherer having a second plurality of crop engaging protuberances spaced along the row unit from the frame end to the head end, the second plurality of protuberances extending and operating in a second gatherer plane, wherein the first and second pluralities of crop engaging protuberances extend oblique to the row unit plane from the frame end to the head end, wherein the first gatherer plane is oblique to the second gatherer plane, and wherein both the first gatherer plane and the second gatherer plane are oblique to the row unit plane, the first and second gatherer planes intersecting at a first distance from the ground, and wherein a plane perpendicular to the first gatherer plane intersects a plane perpendicular to the second gatherer plane at a second distance from the ground, the first distance being less than the second distance; and a work plane disposed between the first and second gatherers, the work plane being substantially perpendicular to the ground.

18. A row crop header for a harvesting machine, the harvesting machine supported by and moveable over a ground, the row crop header comprising:

a frame;

a plurality of row units having a frame end and a head end, the plurality of row units including:

a first row unit supported by the frame, the first row unit including a first gatherer having a first plurality of crop engaging protuberances spaced along the first row unit from the frame end to the head end, the first plurality of protuberances extending and operating in a first gatherer plane; and a second row unit adjacent the first row unit, the second row unit including a second gatherer adjacent the first gatherer and having a second plurality of crop engaging protuberances spaced along the second row unit from the frame end to the head end, the second plurality of protuberances extending and operating in a second gatherer plane, wherein the second gatherer plane is oblique to the first gatherer plane, wherein the first gatherer plane of the first row unit intersect the second gatherer plane of the second row unit at a first distance from the ground, and a plane perpendicular to the first gatherer plane intersects a plane perpendicular to the second gatherer plane at a second distance from the ground, the first distance being greater than the second distance, and wherein the first and second pluralities of crop engaging protuberances extend oblique to the one another from the frame end to the head end.

* * * * *